United States Patent Office 3,492,129
Patented Jan. 27, 1970

3,492,129
METHOD OF MAKING CREAM CHEESE
Donald R. Carswell, Lake Bluff, and John C. Hurlburt, Evanston, Ill., assignors to National Dairy Products Corporation, New York, N.Y., a corporation of Delaware
No Drawing. Filed Feb. 16, 1967, Ser. No. 616,488
Int. Cl. A23c *19/02*
U.S. Cl. 99—116                                    3 Claims

ABSTRACT OF THE DISCLOSURE

A method for producing cream cheese wherein a first mix is ripened to an acidity of from 0.70 to 0.90 percent equivalent lactic acid. A non-acidified second mix is blended with the ripened first mix to provide a blended mix having an acidity of between 0.50 and 0.70. The blended mix is then heated and the whey separated therefrom to provide cream cheese which is resistant to wheying off without the use of non-dairy stabilizers.

---

This invention relates to the manufacture of cream cheese and like cheeses, and more particularly relates to cream cheese which is resistant to wheying off during storage without addition of non-dairy stabilizing agents.

Cream cheese is a soft, mild, acid coagulated, uncured cheese made of cream or a mixture of cream and milk made by the so-called Neufchatel process. In the United States the name Neufchatel cheese has been given to such cheese which has a lower butterfat content and a higher moisture level than is present in cream cheese. For the purpose of this application, the term "cream cheese" is intended to refer to both cream cheese and Neufchatel cheese as known in the United States unless otherwise indicated.

In making cream cheese, sweet whole milk and/or skim milk and sweet cream are blended in pre-selected proportions to form a cream cheese mix. The cream cheese mix normally has a butterfat content of from about 10 percent to about 14 percent, but may have a butterfat content of from 7 percent to about 20 percent.

The cream cheese mix is pasteurized and homogenized after which it is cooled, usually to a temperature between 62° F. and 90° F., and is then inoculated with a lactic acid culture. At times, rennet may be used to aid in the coagulation of the mix. The mix is held at this temperature until it has ripened and a coagulum is formed. The acidity of the coagulum is then from about 0.6 percent to about 0.9 percent (calculated as percent lactic acid).

After the desired acidity is obtained, the curd is separated from the whey and is thereafter packaged. In this connection, optimum separation of the curd from the whey is effected at a pH below the iso-electric point, i.e., a pH below about 4.4. At a pH above the iso-electric point separation of the curd from the whey is incomplete.

One known process for making cream cheese which includes a mechanical separation of the curd is disclosed in United States Patent No. 2,387,276. In accordance with the method of that patent, after the mix is properly ripened, it is heated to an elevated temperature to break the viscosity of the mix. Thereupon, the heated mix is centrifuged at the elevated temperature to separate the curd from the whey. The separated curd is salted, stabilizing gums are added and the curd is then packaged.

One problem encountered with cream cheese which is packaged in a heated condition is the tendency for the cheese to "whey off" during storage. Wheying off is a condition in which some of the whey in the cheese separates from the cheese and collects on its surface in milky or translucent drops. This may cause problems in keeping the cheese, particularly when an extended shelf life is desired. Wheying off may be minimized by employing non-dairy stabilizers, such as gelatin, carob or locust bean gum or the like, in the cheese. However, use of non-dairy stabilizers is not entirely satisfactory for all purposes and the art has unsuccessfully sought to obtain a hot pack cream cheese which is resistant to wheying off without the addition of non-dairy stabilizers.

Accordingly, it is the principal object of the present invention to provide an improved method for the manufacture of cream cheese and the improved product resulting therefrom. It is a more specific object of the invention to provide a cream cheese which is subject to a minimal amount of wheying off without requiring the use of non-dairy stabilizers.

Other objects and advantages of the present invention will become apparent from the following description and claims.

In practicing a process embodying various of the features of the present invention, a cream cheese mix is ripened to a predetermined acidity (calculated as percent lactic acid) and to this mix there is added a substantially unripened second cream cheese mix to reduce the acidity of the mixture to a level of less than about 0.7 percent. The mixture may then be separated into cream cheese and whey according to conventional procedures.

More particularly, in accordance with the present invention, a first mix is prepared from cream and milk and/or skim milk. Equivalent proportions of reconstituted milk solids and/or cream may be employed in place of part or all of the whole milk and cream. Preferably the first mix contains about 10 percent to about 14 percent butterfat by weight of the mix, although butterfat concentrations of from about 6 percent to about 20 percent may be employed to produce either cream cheese or Neufchatel cheese.

It is readily apparent that the butterfat content of cream cheese produced in accordance with the present invention will be related to the butterfat content of both the first mix and the second mix. Where the butterfat content of the first mix is higher than necessary, the butterfat content of the second mix may be lower, so that the resulting mixture of the two mixes has the requisite fat content to produce the proper amount of fat in the finished product. The first mix and the second mix may be obtained from a previously prepared common source and would thus have the same level of butterfat.

The first mix and the second mix may be heat treated prior to use in making cream cheese at an elevated temperature for a period of time sufficient to denature serum protein, i.e., non-casein protein, contained therein. As a result of denaturation heat treatment a physico-chemical change is effected in the serum protein which causes such protein to become sensitive to acid and to co-precipitate with casein upon acidification to the iso-electric pH. Denaturation of serum protein may be effected at temperatures of from about 185° F. to about 230° F. for periods of time of from about six minutes to about 30 seconds, respectively. Other equivalent times and temperatures for effecting the desired denaturation of serum protein may readily be determined by those skilled in the art.

The mixes, if not heat treated to effect denaturation of serum protein, may be pasteurized and homogenized in the usual manner. The mixes are then cooled to from about 60° F. to 90° F.

The first mix is then inoculated with a lactic acid starter culture and ripening of the mix is effected. A small amount of rennet may be added, if required, according to conventional procedures. The ripening of the first mix may be effected by a long set or a short set as desired. When a long set is employed, about 0.75 percent to 1 percent of starter, by weight of mix, is added, while in a short set about a 5 percent level of starter is employed.

Ripening is performed at temperatures of from between about 60° F. and about 90° F. in accordance with conventional procedures.

The first mix is allowed to ripen until the acidity of the coagulum reaches a level of from between about 0.7 percent and about 0.9 percent, preferably from about 0.80 percent to about 0.85 percent. The higher acidities in the ripened mix result in a better flavored final product and are therefore preferred.

As pointed out above, the second mix, hereinafter sometimes referred to as unripened mix, is pasteurized, if not previously heat treated to effect denaturation of serum protein, and homogenized. The second mix is then added to the ripened first mix until the acidity of the mixture has been lowered to a level of less than 0.7 percent, preferably to a level of from about 0.50 percent to about 0.65 percent.

As previously stated, the second mix is substantially unripened, although some acid may be present in the second mix so long as the mixture of ripened first mix and unripened second mix has an acidity in the range referred to above. For purposes of acid control in the second mix it is preferred that the second mix is not inoculated with acid producing bacteria and that the second mix be unripened, except to the extent caused by naturally occurring bacteria. In this connection, it is also preferred that the mixture of ripened first mix and unripened second mix not be held for any substantial time after blending to prevent any further acid buildup by refermentation.

The amount of unripened mix required to reduce the acidity of the mixture within the desired range is, of course, dependent upon the level of acidity which has been reached in the ripened first mix and the total acidity of the unripened second mix. The mixture of ripened mix and unripened mix may be effected by any suitable means.

The resultant coagulum, which now has an acidity of from between about 0.50 percent and about 0.70 percent may then be heated to a temperature of from about 130° F. to about 180° F., under agitation, to break the viscosity of the mix. The whey is then separated from the curd by any suitable method such as by centrifugal separation or the use of draining bags. A preferred method of separating the whey from the curd is by centrifugal separation while the curd and whey are in a heated condition.

After separation, it is generally preferred to pack the cream cheese product at an elevated temperature so as to increase the shelf life thereof. However, further processing of the curd by cold working of the curd to improve texture, such as on a chill roll, may be effected. When such a process is employed the heated curd is deposited on a refrigerated roll in a relatively thin layer to chill it rapidly, after which it is removed from the roll. The chilling process has been found to provide a desired curd texture.

A cream cheese with acceptable flavor can be produced in accordance with the procedure of the present invention. Further, no additional non-dairy stabilizers are necessary to provide a cream cheese that will not exhibit undesirable separation or wheying off upon subsequent prolonged storage.

Although not intending to be bound by any theory, it is believed that the decreased tendency to whey off of cream cheese produced by the method of the present invention is the result of changed physico-chemical relationships among the components of the cream cheese, resulting from changes in the stabilization characteristics of the total protein. This may be attributed to the fact that heat treatment of the ripened cream cheese mix at higher temperatures is effected only when the level of acidity in the whey is less than about 0.7 percent and the unripened mix provides a loose textured protein substrate for absorption of residual whey.

The following are specific examples of processes which embody various of the features of the invention.

EXAMPLE I

A cream cheese mix containing 12 percent butterfat was prepared. The cream cheese mix was heat treated at 230° F. for 30 seconds in a tubular heat exchanger to denature the serum protein thereof. After being heat treated, the cream cheese mix was homogenized at 2000–3000 p.s.i. in a single stage homogenizer.

Half of the cream cheese mix was then pumped into a holding tank to provide a first mix and was then cooled to 70° F. To the first mix there is added 0.75 percent by weight of lactic acid cream cheese starter, and one milliliter of rennet per thousand pounds of mix, and ripening of the first mix was thereafter effected at a temperature of about 75° F.

When an acidity of 0.85 percent had been reached, the unripened half of the cream cheese mix previously prepared was added to the ripened mix while the mixture was gently stirred until the resultant acidity was 0.6 percent.

The resultant mixture of unripened mix and ripened mix was then heated to 175–180° F. in a swept surface heat exchanger, i.e., a heat exchanger in which heating is effected in a thin film unit with repeated scraping of the heat exchange surface. The mixture was then passed through a centrifuge, wherein the whey was separated from the curd to provide a cream cheese having a fat content of 33.4 percent. At the time of separation of the whey from the curd the mixture had a pH of 4.8 which is substantially higher pH than is considered suitable in conventional commercial practice for making cream cheese.

The cream cheese was then blended with salt but no additional non-dairy stabilizers were added. The cream cheese was then packed in conventional packages at a temperature of 165–175° F.

The cream cheese was fully acceptable in appearance and flavor and exhibited minimal wheying off when the cheese was stored for six weeks.

EXAMPLE II

Cream cheese was prepared according to the procedure of Example I except that the cream cheese mix was not heat treated to denature serum protein but was pasteurized and homogenized prior to acidification of the first mix. The acidity of the ripened first mix was allowed to develop to 0.80 percent. Unripened mix was then added to reduce the acidity to a level of 0.56 percent. The resultant mixture of ripened and unripened cream cheese mixes was agitated, heated to 170° F. and separated in a centrifugal separator at a pH of 4.7. The cream cheese curd was cooled by means of a chill roll to a temperature of 40° F. and the product was then packaged.

The cream cheese of Examples 1 and 2 and a conventional cream cheese control sample containing locust bean gum stabilizer at a level of 0.25 percent were stored at a temperature of 45° F. for 12 weeks. The cream cheese samples of Examples I and II, containing no stabilizing gums, were acceptable in appearance and flavor. There were no indications of whey separation in any of the samples of Examples I and II. The flavor and texture of the cream cheese of Examples I and II were fully acceptable in flavor and appearance.

Although certain features of the invention have been set forth with particularity in order to accurately describe the preferred method of practicing the invention, alternative procedures within the skill of the art are contemplated. Various of the features of the present invention are set forth in the following claims:

We claim:
1. A method for manufacture of cream cheese which is resistant to wheying off which method comprises the steps of preparing a first cream cheese mix, ripening said first mix with a lactic acid starter culture to provide a ripened mix having an acidity of from about .70 to about .90 percent lactic acid, preparing a substantially non-acidified second cream cheese mix, blending the ripened first mix and the second mix in proportions to provide a blended mix having an acidity of from about .50 to about .65 percent equivalent lactic acid and then heating the mix and separating the whey from the heated mix to provide the desired cream cheese product.

2. The method of claim 1 wherein at least one of the first mix and second mix are heat treated prior to use at an elevated temperature for a time sufficient to denature serum protein.

3. The method of claim 2 wherein said heat treatment is effected at temperatures of from about 185° F. to about 230° F. for periods of time of from about six minutes to about thirty seconds, respectively.

References Cited

UNITED STATES PATENTS

| 2,712,999 | 7/1955 | Strezynski | 99—116 |
| 3,012,889 | 12/1961 | Angetet et al. | 99—116 |
| 3,316,098 | 4/1967 | Noznick et al. | 99—116 |

OTHER REFERENCES

Manual For Dairy Manufacturing Short Courses, Dairy Manufacturing Division, The Pennsylvania State University, Kurtz Bros. Clearfield, Pa., 1956 (pages 56 and 57).

LIONEL M. SHAPIRO, Primary Examiner

D. M. NAFF, Assistant Examiner

U.S. Cl. X.R.

99—59